United States Patent [19]

Adler et al.

[11] 3,739,201

[45] June 12, 1973

[54] HIGH VOLTAGE REGULATOR DEVICE

[75] Inventors: Robert Adler, Northfield; George W. Hrbek, Arlington Heights, both of Ill.

[73] Assignee: Zenith Radio Corporation, Chicago, Ill.

[22] Filed: June 9, 1971

[21] Appl. No.: 151,337

[52] U.S. Cl. .................... 310/8, 307/299, 310/8.1, 317/235 A, 323/8

[51] Int. Cl. .................... H01v 7/00

[58] Field of Search .................... 310/8, 8.1, 8.3, 310/8.5, 8.6, 9.1, 9.4, 9.5; 323/16, 8; 317/235 B; 307/299, 308

[56] References Cited

UNITED STATES PATENTS

| | | | |
|---|---|---|---|
| 3,311,756 | 3/1967 | Nagata et al. | 323/16 UX |
| 3,553,498 | 1/1971 | Yamada | 307/299 |
| 3,310,687 | 3/1967 | Howell | 307/88.3 |
| 3,562,608 | 2/1971 | Gallagher | 317/235 A |
| 3,287,506 | 11/1966 | Hahnlein | 310/8.1 UX |
| 3,460,005 | 8/1969 | Kanda et al. | 310/8 UX |
| 3,351,786 | 11/1967 | Muller et al. | 310/8 |
| 3,585,415 | 6/1971 | Muller et al. | 310/8 |
| 2,898,477 | 8/1959 | Hoesterey | 310/8.1 X |

*Primary Examiner*—J. D. Miller
*Assistant Examiner*—Mark O. Budd
*Attorney*—John J. Pederson and John H. Coult

[57] ABSTRACT

A film of semiconductor material shunts a source of high-voltage unregulated potential. The film is caused to act as an infinite series of infinitesimal field-effect transistors with gates of progressively higher potential. In response to a change in the value of the high voltage, the conductance of the semiconductive film is changed in a compensatory manner. In one version, the infinite series of gates is internally created within the film by piezoelectric action. In other approaches, the film is dielectrically coupled to a parallel strip of resistive material also coupled across the high-voltage source. The resistive strip provides the effective gate electrodes of the distributed field-effect transistor chain.

7 Claims, 6 Drawing Figures

Inventors
Robert Adler
George W. Hrbek

By [signature]
Attorney

HIGH VOLTAGE REGULATOR DEVICE

The present invention pertains to distributed field-effect transistors. More particularly, it relates to solid state devices of a distributed nature which may serve as variable loads upon high-voltage sources in order to compensate for changes in the high voltage, thus acting as voltage regulators.

It is sometimes desired to regulate very high voltages in a present-day color television receiver. For example, the d.c. potential required for the anode of the cathode-ray tube is of the order of 25 to 30 kilovolts. The usual source of that potential is a rectifier following the horizontal deflection output transformer, in which energy is available as a result of retrace or flyback pulses occurring therein. That source of energy, however, exhibits a comparatively high internal impedance as a result of which its voltage regulation is poor. That is, the derived high voltage tends to fluctuate with changes in current drawn by the cathode-ray tube in correspondence with changes in brightness of the reproduced picture elements.

To compensate or regulate such voltage fluctuations, it has been customary to employ a vacuum triode in shunt with the high voltage supply. The grid of the diode is driven from a lower voltage control circuit so as to provide the desired regulation. Triodes having the necessary insulation characteristics to serve in this capacity are both bulky and expensive. Also, they may be a source of X-radiation and thus need to be carefully shielded. Moreover, the employment of a vacuum triode is inconsistent with the present trend of using solid state devices to achieve increased reliability, decreased heat dissipation and a more compact apparatus.

It has been proposed to utilize various different kinds of transistors arranged to operate as a voltage regulator in high voltage systems. Because most such semiconductor devices, however, are unable by themselves to withstand the levels of high voltage under consideration, it has further been suggested to employ a series of such transistors across the high voltage load circuit. However, variations between the characteristics of the individual different transistors have resulted in the need for complex arrangements of bridge or ladder circuitry in order to correct errors in potential distribution that would otherwise occur across the string of transistors. Examples of circuitry of this sort may be found by reference to U.S. Letters Patent Nos. 3,018,433 in the name of J. Stone IV and 3,024,422 in the name of Leonard Eric Jansson. Such approaches involve the need for a very large number of circuit elements or components, and the necessity of employing a large number of transistors tends to defeat the economy sought in dispensing with use of the high-voltage triode.

It is, accordingly, a general object of the present invention to provide a new and improved voltage-responsive device.

It is a more specific object of the present invention to provide a solid-state voltage-responsive device which overcomes the deficiencies and difficulties adverted to above.

Another object of the present invention is to provide a new and improved solid-state voltage regulator that is capable of being fabricated as a unitary assembly.

The invention provides a high-voltage device for use with a source of high voltage. A film of semiconductive material has opposite ends arranged to be coupled across the source. Included are means for creating along the semiconductive film an effective series of infinitesimal field-effect gate electrodes that exhibit progressively higher potentials throughout the length of the film. Finally, the device comprises control means responsive to variations in the high voltage for generating transverse electric fields between the gate electrodes and the corresponding portions of the semiconductor film to alter the conductance of the film in a desired manner so as to improve the regulation of the high voltage.

The features of this invention which are believed to be novel are set forth with particularly in the appended claims. The invention, together with further objects and advantages thereof, may best be understood, however, by reference to the following description taken in conjunction with the accompanying drawing, in the several figures of which like reference numerals identify like elements, and in which:

Figure 1:
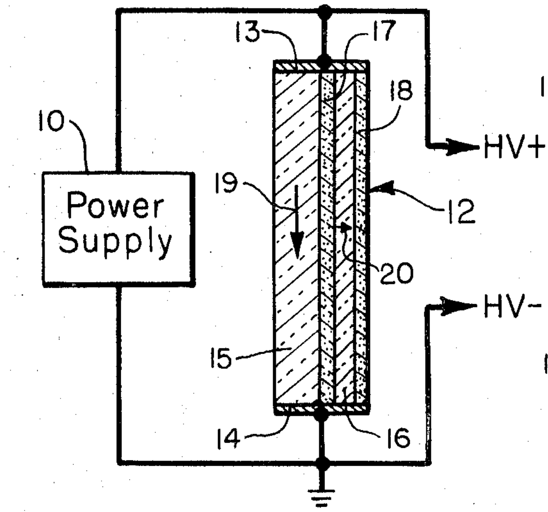
FIG. 1 is a partly schematic view of an electromechanical form of high-voltage regulator embodying the invention.

In FIG. 1, power supply 10 is a high-voltage power supply whose voltage is subject to variation with change in load. The load is connected between the terminals indicated HV+ and HV−. Such a load may be the final anode of a cathode-ray tube as discussed in the introduction hereto. Shunted across power supply 10 is a plural-layer assembly 12 having electrodes 13 and 14 conductively affixed to opposite ends of the various layers and with those electrodes being respectively connected across opposite sides of power supply 10. The different layers are composed of a bar 15 of piezoelectric material, an additional strip 16 also of piezoelectric material, a strip or element 17 of resistive material sandwiched between bar 15 and strip 16, and a film of semiconductor material 18 on the other side of strip 16. Each of strips 16 and 17 and film 18 preferably are quite thin compared to the transverse thickness of piezoelectric bar 15.

As indicated by arrow 19, piezoelectric bar 15 is so poled and oriented that its length changes in correspondence with a change in the high voltage level appearing across electrodes 13 and 14. As depicted by an arrow 20, on the other hand, piezoelectric strip 16 is so poled or oriented that a transverse electric field is generated within it when subjected to longitudinal stress by the piezoelectric action of bar 15. Resistive element 17 constitutes a uniform voltage divider along the surface of piezoelectric bar 15. Semiconductor film 18, which is formed of a material such as cadmium selenide, exhibits a level of conductivity for current flow between electrodes 13 and 14 that is controlled by the transverse electric field generated by a piezoelectric strip 16.

Suitable materials for piezoelectric bar 15 may include either natural crystals such as quartz or crystalline zinc oxide or piezoelectric ceramics such as barium titanate, lead zirconium titanate (PZT), or the like. To provide the desired response, quartz crystals should be oriented with the X axis in the longitudinal dimension, or zinc oxide crystals with the Z axis in the longitudinal dimension. Piezoelectric strip 16 may be of the same material, oriented orthogonally with respect to bar 15. The high resistance element 17 may be of a thin film cermet material such as a gold-tantala ($Au$-$Ta_2O_5$) cermet prepared by simultaneous sputtering of about 30 to 35 percent gold and 65 to 70 percent tantalum pentoxide which results in fine particles of metal dispersed in the dielectric; such a material exhibits a resistivity of the order of 10 megohms per square. Semiconductor film 18 may be formed of a field-effect-responsive semiconductor material such as cadmium selenide, for example.

The entire assembly 12 must be suitably dimensioned to withstand the applied high voltages to which it is to be subjected. Higher voltage ratings or smaller size for a given voltage rating may be provided by encapsulating assembly 12 in a glass or ceramic envelope (not shown) which may be either evacuated or filled with an insulating gas such as a fluorinated hydrocarbon known as Freon. Compactness of course is a very substantial advantage when natural crystals such as quartz are employed because their costliness is greatly reduced with diminished size.

In operation, any change in the high voltage level creates a corresponding change in the elongation of piezoelectric bar 15 which, in turn, alters the stress upon piezoelectric strip 16. A uniformly-distributed transverse field is generated by piezoelectric strip 16 everywhere between voltage dividing strip 17 and semiconductor film 18. A change in the level of that transverse electric field as a result of change in stress of piezoelectric element 16 results in a variation of the conductivity of semiconductor film 18. The magnitude of the field developed by piezoelectric strip 16 depends only upon the amount of stress and the piezoelectric properties of strip 16; since the electric field generated is not a function of the thickness of piezoelectric strip 16, the latter should be as thin as practical in order to maximize the electric field coupling between resistive strip 17 and the semiconductor layer.

It will thus be seen that resistive strip 17 serves to establish a reference condition corresponding to zero transverse field or to a transverse field uniformly distributed over the entire surface of the semiconductor film, while the direct effect of piezoelectric strip 16 is to change the conductivity of semiconductor film 18. The action of the piezoelectric strip in effect modulates the uniformly-distributed field established by resistive strip 17, and thus, in turn, results in a modulation of current flow within the semiconductor. This occurs because, with respect to semiconducting film 18, the internal electric field acts as an infinite series of infinitesimal field-effect gates distributed throughout the length of film 18. The combined effect of all the effective gates serves to control the total current conduction. It is as if semiconductor film 18 were a series of field-effect transistors with each source connected to the next drain and with the successive gate electrodes connected to a corresponding succession of taps on a voltage divider connected across the high voltage source. Because, however, all of the elements are homogeneous, the voltage-dividing action is uniformly distributed so that the entire assembly acts as an infinite series of infinitesimal field-effect transistors including gates which exhibit progressively higher potentials throughout the length of the film.

Acting as a regulator, an increase in the high voltage level causes piezoelectric bar 15 to increase in length which, in turn, increases the stress within piezoelectric strip 16. The increased transverse electric field produced by the latter serves to effect the flow of a greater current level through the strip. That increase in current drawn from power supply 10 results in a consequent lowering of the high voltage potential in a compensatory manner. Conversely, an initial lowering of the supply voltage results in decreased elongation of bar 15. The consequent decreased stress in piezoelectric strip 16 produces the opposite change of internal field-effect and results in reduced semiconductor film conductivity so as to remove load from power supply 10 and permit its high voltage level to rise. Thus, piezoelectric bar 15 serves as a control means that responds to a variation in the source voltage for changing the distributed field effect in a direction altering the conductance of semiconductor layer 18 in a correlated manner. It may be noted that the described field-effect action may be either in the depletion mode mentioned or in an enhancement mode. Similarly, all piezoelectric properties may be reversed from that shown, as in the case wherein bar 15 would contract with increasing high voltage. Of course, assembly 12 is suspended or otherwise mounted so as to permit the necessary change in elongation of piezoelectric bar 15.

Figure 2:
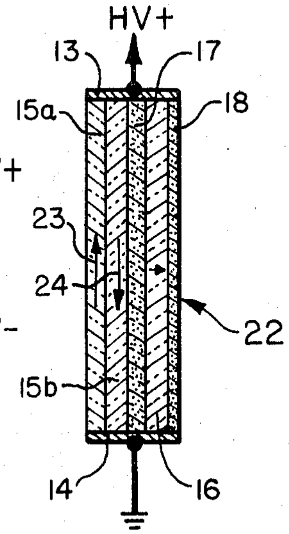
FIG. 2 is a diagram of a high-voltage regulator alternative to that of FIG. 1.

A slightly modified assembly 22 as shown in FIG. 2 is essentially the same as assembly 12 of FIG. 1 except that the piezoelectric bar in this case is split longitudinally into a pair of slabs **15*a* and 15*b*. The first slab 15*a* is poled or oriented longitudinally in one direction as indicated by an arrow 23, while the other slab 15b is poled or oriented in the opposite direction as indicated by an arrow 24 so that the two slabs together form a piezoelectric bender or bimorph. Otherwise, the overall structure of assembly 22 is the same as that of assembly 12. Moreover, the operation also is the same except that, for a given applied high voltage and assuming the use of the same materials, the stress produced in piezoelectric strip 16 is greater in assembly 22 than in assembly 12. Consequently, the degree of control effect for a given change of high voltage level is larger in the version of FIG. 2**.

In the systems of both FIGS. 1 and 2, if semiconductor layer 18 is used in an enhancement mode, it exhibits a threshold effect in that a certain finite level of transverse electric field must be applied in order to initiate current conduction. That delay in action is similar to the result obtained in a conventional field effect transistor operating in the enhancement mode. Once the threshold level is exceeded, however, the operation of the systems of FIGS. 1 and 2 approaches linearity. For many regulator applications, it is desirable that the regulatory action occur only when the high voltage approaches closely the desired nominal value. That manner of operation advantageously may be obtained with the system of FIG. 3.

Figure 3:
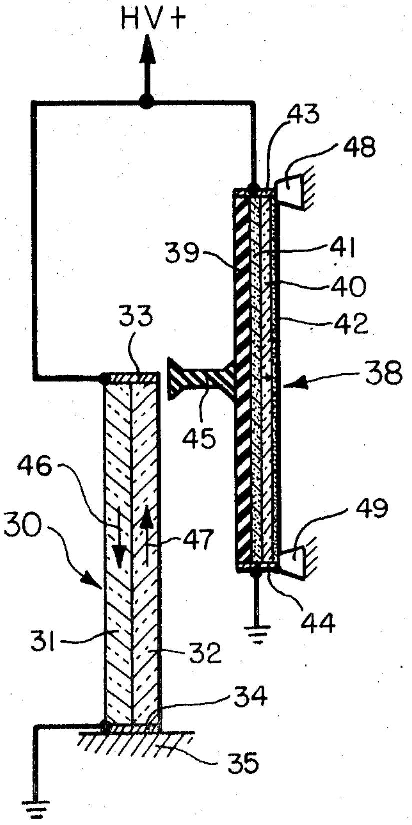
FIG. 3 is a diagram of yet another high-voltage regulator alternative to those of FIGS. 1 and 2.

In FIG. 3, a piezoelectric bender 30 is composed of a pair of contiguous piezoelectric slabs 31 and 32 affixed between electrodes 33 and 34. Electrode 33 is connected to the positive high voltage terminal, while electrode 34 is returned to the plane of reference potential or ground. The low-voltage end of bender 30 is immobilized as by securing electrode 34 to a fixed support 35.

A second piezoelectric bender 38 is composed of a plurality of layers that include a passive element 39, which need not be piezoelectric and should be essentially non-conductive, a thin piezoelectric strip 40, a resistive strip 41 sandwiched between passive element 39 and piezoelectric strip 40, and a semiconductor film 42 contiguous with the external side of piezoelectric strip 40. The entire plurality of layers are disposed between electrodes 43 and 44 that, in turn, are connected respectively to the high-voltage and low-voltage, or ground, terminals. Projecting outwardly from passive element 39 is a push rod 45 the free end of which normally is spaced a short distance from the free or unsupported end of bender 30.

In operation, the second bender 38 is normally at rest, as a result of which semiconductor film 42 exhibits a selected design-center conductivity. As indicated by arrows 46 and 47, piezoelectric bars 31 and 32 are poled or oriented longitudinally in opposite senses in a manner similar to that of bars 15*a* and 15*b* of FIG. 2. Application of high voltage results in a deflection of the free end of bender 30 toward the free end of push rod 45. The spacing between push rod 45 and bender 30 is selected so that the latter is in physical contact with the former only after the high voltage reaches the lower end of the voltage range within which regulatory action is desired. Within that range, the force exerted by bender 30 upon bender 38 creates a field-producing stress within piezoelectric strip 40 that, as in the case of piezoelectric strip 16 of FIGS. 1 and 2, results in a compensatory modulation or control of the current flow within semiconductor film 42. Again, the combination of voltage-dividing action in resistive strip 41, the stress-produced field components and the properties of the semiconductor film act as a distributed field-effect transistor. To permit this action, bender 38 is mounted so that the imposition of a physical force upon push rod 45, and hence upon the central portion of bender 38, results in the respective end portions carrying electrodes 43 and 44 being pressed against fixed insulative supports 48 and 49.

Figure 4:
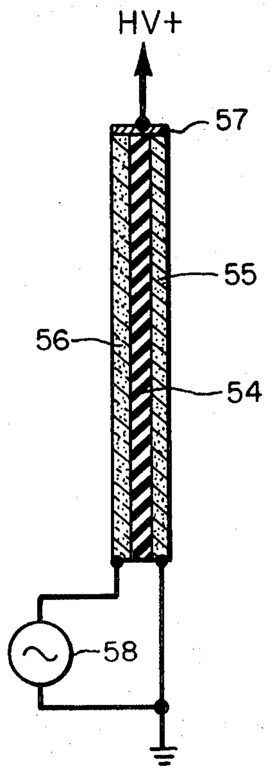
FIG. 4 is a diagram of another version of a high-voltage regulator embodying the invention.

An entirely non-piezoelectric regulator is the subject of FIG. 4 wherein a layer 54 of dielectric material is sandwiched between a film 55 of semiconductive material and a strip 56 of resistive material. The high-voltage terminal of the unregulated power supply is connected to an electrode 57 bridging one end of film 55 and strip 56, while the other end of semiconductor film 55 is connected to the other side of the high-voltage supply. A control potential, which in the regulator environment is derived from the high-voltage level, is represented as a control source 58 connected between the ends of film 55 and strip 56 remote from the high-voltage terminal.

Strip 56 is of resistance material which acts as a distributed series of gate electrodes, and the combination of that strip with the semiconductor film separated by the thin dielectric layer constitutes a structure that again may be considered as a distributed infinite series of infinitesimal field-effect transistors. Upon application of the unidirectional high voltage between the two ends of the strip and film assembly, the potential distribution along semiconductor film 55 is uniform and stable and duplicates, to a first order approximation, the potential distribution along gate strip 56. Upon insertion of a control voltage from source 58 between film 55 and strip 56, a similar voltage difference arises between corresponding points along the entire length of the device, except for a short portion near the high-voltage end where the strip and film are connected together by electrode 57. This condition resembles the effect that would occur if an applied voltage difference were caused to propagate along the film and strip combination. The current through semiconductor film 55 changes in proportion to the applied voltage. Only one end of the assembly, however, is suitable for controlling the flow of current in film 55. That is the end of the semiconductor film at which majority carriers enter the semiconductor. A control voltage applied between film 55 and strip 56 at the other end has no significant effect, indicating a high impedance at that end. Again for the conventional polarity of the high-voltage supply in television receivers, an N-type semiconductor film is utilized so that control may be exercised at the low voltage or grounded end of the device.

Figure 5:
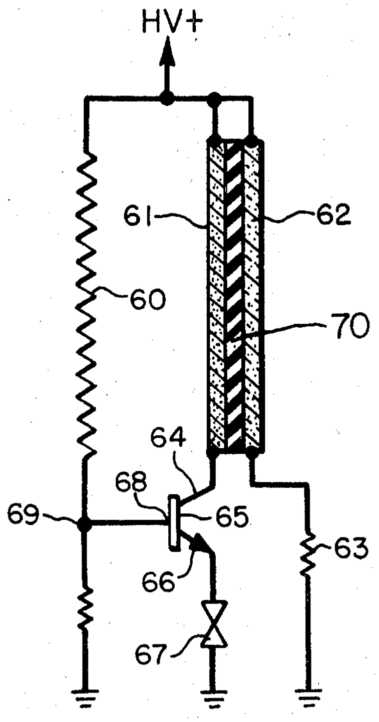
FIG. 5 is a schematic diagram of a high-voltage regulator alternative to that of FIG. 4.

FIG. 5 illustrates a modified arrangement and also includes control circuitry particularly useful for regulating the high voltage in a television receiver. Connected in common at their one ends to the high-voltage terminal are a voltage divider 60, a semiconductor film 61 and another voltage divider 62. The other end of voltage divider 62 is returned to ground, the other side of the high-voltage supply, through a bias resistor 63. The other end of semiconductor film 61 is connected to the collector 64 of an NPN transistor 65. The emitter 66 of the transistor is returned to ground through a Zener diode 67 which establishes a fixed emitter bias potential. The base 68 of the transistor is connected to a comparatively low voltage tap 69 on divider 60 which has its low voltage end also returned to ground. Semiconductive film 61 and passive voltage divider 62 are dielectrically coupled, through an insulating layer 70, to constitute a distributed field-effect transistor.

Tap 69, while only a few volts above ground, exhibits a potential that varies in proportion to the high voltage HV+. The potential presented at tap 69 constitutes a control signal applied to transistor 65. The collector current of transistor 65 enters at the negative end of semiconductor film 61 which again in this case is of N-type material. The level of that collector current, which is conducted through film 61, determines the loading upon the high voltage supply. Voltage divider 62 again serves as a distributed gate electrode in the manner previously described in connection with FIG. 4.

Instead of using a separate voltage divider 60 for obtaining the control potential as shown in FIG. 5, that control potential may be derived at the point between voltage divider 62 and resistor 63, in which case the other voltage divider 60 may be omitted. The result then becomes that of FIG. 6 which will be recognized as constituting a combination of the solid-state device of FIG. 4 and the control circuit of FIG. 5 as modified.

Figure 6:
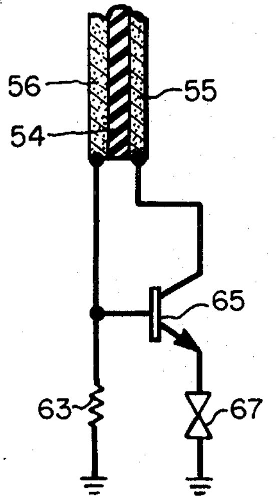
FIG. 6 is a fragmentary diagram of an alternative circuit arrangement for the system of FIG. 4.

In practice, the arrangements of FIG. 4–6 may be preferred because they permit fabrication of the structure as a unitary assembly having a minimum of elements. Detailed calculations of the operation of the distributed field-effect transistor reveal that the device exhibits unconditional stability. It may be considered to operate as an impedance transformer having a low resistance input and a high resistance output so as to permit transferring a control current to a high-voltage, high-impedance output circuit. As utilized in a color television receiver, it is desired that the voltage regulator respond at a modest speed of the order of 100 hertz. Utilizing for the semiconductor film a material exhibiting a carrier mobility of 100 $cm^2$/volt-seconds and with the film having an overall length of 2 inches, the total transit time of the carriers is only 10 microseconds. Since the current control information in effect propagates along the film roughly at the speed at which the carriers travel, a ten microsecond transit time is more than adequate. In operation, alternating-current components may be encountered on the high-resistance and semiconductor materials. When necessary, they may be bypassed by the use of capacitor strips disposed along the resistance dividing strip between adjacent portions of the device.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

We claim:

1. A high-voltage device responsive to a source of high voltage and comprising:

a film of semiconductive material the opposite ends of which are arranged to be coupled across said source;

means for creating along said film an effective series of infinitesimal field-effect gates exhibiting progressively higher potentials throughout the length of said film;

and control means responsive to a variation in high-voltage level for generating transverse electric fields between said gates and corresponding portions of said film to alter the conductance of said film in a selected manner, said film being associated with a strip of piezoelectric material wherein stress created within said strip changes said electric fields, said control means including a piezoelectric actuator responsive to said variation for effecting a change in said stress within the piezoelectric strip.

2. A high-voltage device as defined in claim 1 in which said actuator exhibits a change in elongation in response to said variation and the stress in said piezoelectric strip is a function of the degree of said elongation.

3. A high-voltage device as defined in claim 1 in which said actuator exhibits a bending action in response to said variation, and the stress in said piezoelectric strip changes in response to change in the degree of such bending.

4. A high-voltage device as defined in claim 1 in which said actuator exhibits motion in response to said variation, and said stress is developed in said piezoelectric strip only in response to an amount of said motion exceeding a predetermined minimum movement.

5. A high-voltage device responsive to a source of high voltage and comprising:

a film of semiconductive material the opposite ends of which are arranged to be coupled across said source;

means for creating along said film an effective series of infinitesimal field-effect gates exhibiting progressively higher potentials throughout the length of said film, said creating means including a strip of resistive material the opposite ends of which also are arranged to be coupled across said source with said strip and said film being dielectrically coupled throughout their lengths; and control means responsive to a variation in high-voltage level for generating transverse electric fields between said gates and corresponding portions of said film to alter the conductance of said film in a selected manner, said control means including a source of low voltage proportional to said variation and coupled across the ends of said strip and film nearest to a plane of reference potential, said source of low voltage including a resistor connected in series between said end of said film of semiconductive material and said plane of reference potential.

6. A high-voltage device responsive to a source of high voltage and comprising: a film of semiconductive material the opposite ends of which are arranged to be coupled across said source;

means for creating along said film and effective series of infinitesimal field-effect gates exhibiting progressively higher potentials throughout the length of said film, said creating means including a strip of resistive material the opposite ends of which also are arranged to be coupled across said source with said strip and said film being dielectrically coupled throughout their lengths;

and control means responsive to a variation in high-voltage level for generating transverse electric fields between said gates and corresponding portions of said film to alter the conductance of said film in a selected manner, said control means including a source of low voltage proportional to said variation and coupled across the ends of said strip and film nearest to a plane of reference potential, said source of low voltage including a separate voltage divider to be connected across said source of high voltage.

7. A high-voltage device responsive to a source of high voltage and comprising:

a film of semiconductive material the opposite ends of which are arranged to be coupled across said source;

means for creating along said film an effective series of infinitesimal field-effect gates exhibiting progressively higher potentials throughout the length of said film, said creating means including a strip of resistive material the opposite ends of which also are arranged to be coupled across said source with said strip and film being dielectrically coupled throughout their lengths;

and control means responsive to a variation in high-voltage level for generating transverse electric fields between said gates and corresponding portions of said film to alter the conductance of said film in a selected manner, said control means including a source of low voltage proportional to said variation and coupled across the ends of said strip and film nearest to a plane of reference potential, said source of low voltage further including a transistor the output circuit of which is connected between said ends of said strip and said film and the input circuit of which includes means for establishing a reference voltage.

8. A high DC voltage regulator comprising:

coupling means adapted for coupling to a source of high voltage subject to variation in voltage;

a body of semiconductive material and electrode means connected to spaced portions of said body and coupled to said coupling means for coupling said body in shunt across said source;

means coupled to said coupling means and responsive to any variation in voltage of said source for creating along said body an electric field distribution which increases progressively as a function of distance along the length of said body to establish in said body a distributed field effect, the overall magnitude of which effect varies in correspondence with variation in the voltage of said source, but in a compensatory manner so as to effect regulation of said source.

* * * * *